United States Patent [19]

Tooman

[11] Patent Number: 4,964,795
[45] Date of Patent: Oct. 23, 1990

[54] MANIFOLD ASSEMBLY FOR PLASTIC INJECTION MOLDING

[76] Inventor: Patrick A. Tooman, 2644 Penna St., W. Bloomfield, Mich. 48033

[21] Appl. No.: 144,600

[22] Filed: Jan. 11, 1988

Related U.S. Application Data

[63] Continuation of Ser. No. 806,622, Dec. 9, 1985, abandoned.

[51] Int. Cl.$^5$ .............................................. B29C 45/22
[52] U.S. Cl. .................................... 425/144; 264/40.1; 264/328.8; 264/328.15; 425/549; 425/561; 425/570; 425/572; 425/588
[58] Field of Search ........... 264/328.8, 328.14, 328.15, 264/40.1; 425/143, 144, 547, 549, 567, 570, 572, 581, 588

[56] References Cited

U.S. PATENT DOCUMENTS

| | | | |
|---|---|---|---|
| 3,812,228 | 5/1974 | Skoroszewski | 264/328.14 |
| 4,268,240 | 5/1981 | Rees et al. | 425/570 |
| 4,276,014 | 6/1981 | Acki | 425/547 |
| 4,298,332 | 11/1981 | Aoki | 425/570 |
| 4,422,841 | 12/1983 | Alfonsi et al. | 425/549 |
| 4,500,481 | 2/1985 | Marx, III | 425/144 |
| 4,514,160 | 4/1985 | Davidsmeyer | 425/143 |
| 4,588,367 | 5/1986 | Schad | 425/572 |

FOREIGN PATENT DOCUMENTS 1177213 11/1984 Canada .............................. 425/549

Primary Examiner—Jay H. Woo
Assistant Examiner—Timothy W. Heitbrink
Attorney, Agent, or Firm—Reising, Ethington, Barnard, Perry & Milton

[57] ABSTRACT

A manifold assembly of the type used for conveying plastic injection molding material from a central injection point or sprue to a number of mold cavities or to multiple points within one large mold cavity. The assembly includes an integral manifold and a plurality of nozzles extending radially outward therefrom. Insulating rings are disposed about the nozzles for inhibiting heat transfer between the nozzle and the core or cavity and a stainless steel locating ring is disposed between the sprue and a support member, which supports the assembly. The locating ring inhibits heat transfer from the sprue to the support member. Aluminum plugs are disposed at the terminal ends of the manifold and inhibit heat transfer from the terminal ends. Preload pads are removably secured to the manifold radially opposite the nozzles for insulating and supporting the manifold under pressure. Heater bands supply the heat to the assembly and the temperature of the plastic injection molding material is monitored by thermocouples. The heater bands and thermocouples are disposed in zones about the assembly to facilitate more accurate monitoring of the system.

5 Claims, 2 Drawing Sheets

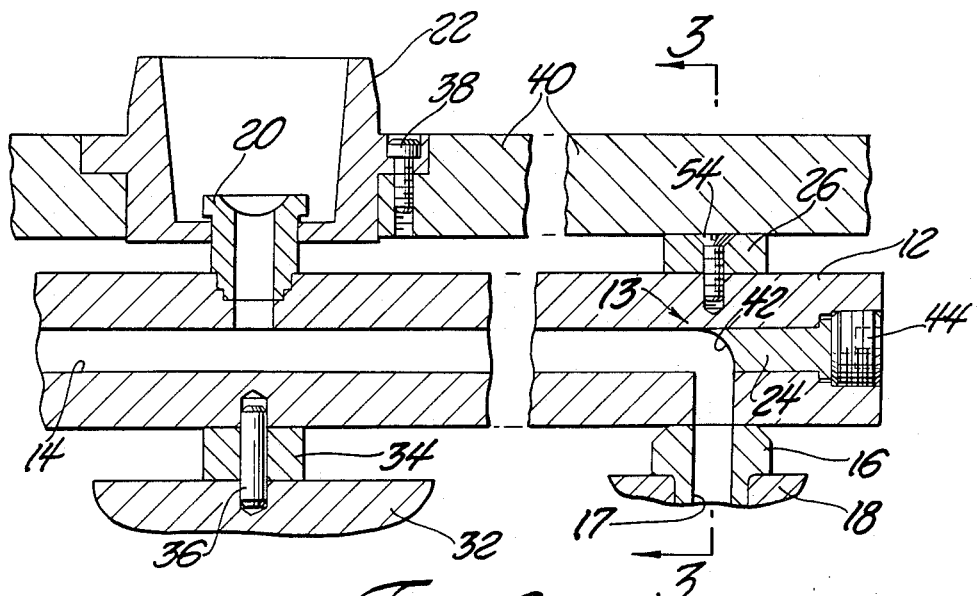
Fig. 2
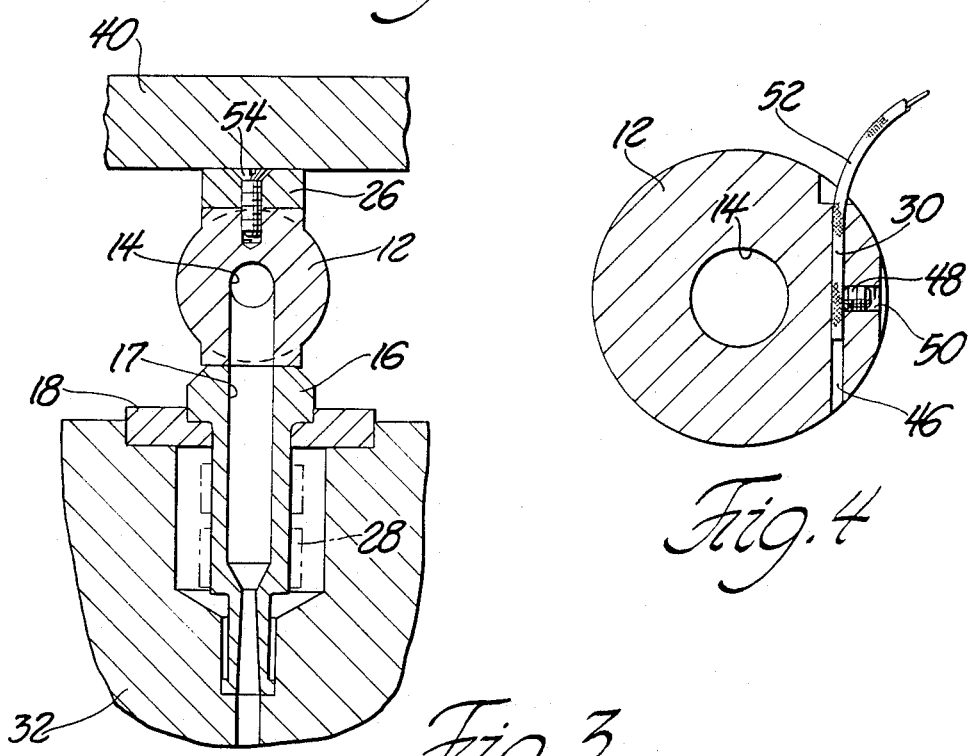
Fig. 3
Fig. 4

MANIFOLD ASSEMBLY FOR PLASTIC INJECTION MOLDING

This application is a continuation, of application Ser. No 806,622, filed Dec. 19, 1985 now abandoned.

BACKGROUND OF THE INVENTION

1. Technical Field

The subject invention relates to an improved manifold assembly of the type used for distributing hot molten plastic from a central injection point or sprue to a number of mold cavities or to multiple points within one large mold cavity.

2. Description of the Prior Art

In manifold assemblies of this type, it is necessary to maintain the hot molten plastic at a specific temperature throughout the injection material flow path. To that end, cartridge heaters which are disposed directly in the manifold flow passage or heater bands which surround the outer surface of the manifold as well as thermocouples, or the like, are employed to maintain this specific temperature as well as monitor it. The configuration or structure of the manifold also plays an important part in the efficient distribution of molten plastic. A multitude of designs exist in the prior art and range from a flat block heated manifold to cylindrical manifolds of the type disclosed in U.S. Pat. No. 4,276,014 granted June 30, 1981 in the name of Katashi Aoki and U.S Pat. No. 4,298,332 granted Nov. 3, 1981 also in the name of Katashi Aoki.

Inherent in the manufacture of flat block manifolds, however, is a multitude of manufacturing and machining processes. In addition, the industry is plagued with problems related to heat loss. More specifically, cartridge heaters, which are used to heat and control the temperature of the plastic, waste heat and are thus inefficient. Also, there exists a lack of insulating means used in conjunction with hot plastic injection molding.

The present invention overcomes all of the aforementioned problems by employing a relatively low cost, highly efficient manifold utilizing various insulating means.

SUMMARY OF INVENTION

The subject invention is related to a manifold assembly for conveying plastic injection molding material into a cavity comprising an integral manifold including a central manifold passage extending therealong. At least one nozzle extends radially outward from the manifold and includes a central nozzle passage extending from the manifold flow passage. An insulating means is disposed about the nozzle for inhibiting the heat transfer between the manifold and the core or cavity.

BRIEF DESCRIPTION OF DRAWINGS

Other advantages of the present invention will be readily appreciated as the same becomes better understood by reference to the following detailed description when considered in connection with the accompanying drawings wherein:

FIG. 2 is a fragmentary cross-sectional view taken substantially along the longitudinal axis of the assembly shown in FIG. 1;

FIG. 3 is a cross-sectional view taken substantially along line 3—3 of FIG. 2; and FIG. 4 is a cross-sectional view of either the manifold or the nozzle showing thermocouple placement.

DESCRIPTION OF THE PREFERRED EMBODIMENT

Figure 1:
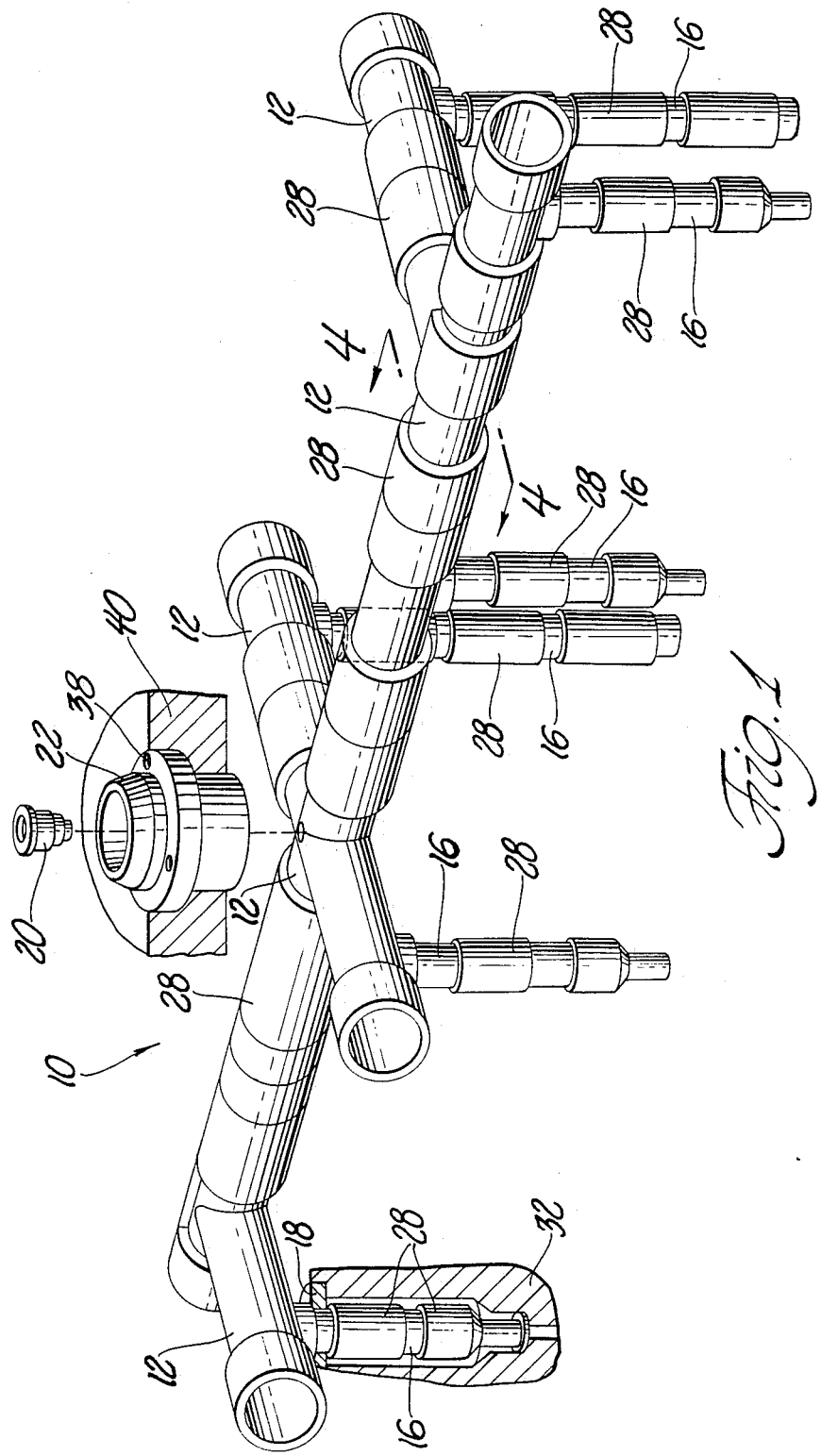
FIG. 1 is a perspective view of a preferred embodiment of the subject invention.

An improved manifold system for plastic injection molding is generally shown at 10. This system includes an integral or one piece, cast, cylindrical manifold 12 including a central flow passage 14 extending along the manifold including each branch of the manifold 12 and at least one nozzle 16 extending downwardly from the manifold 12. Each nozzle 16 includes a central nozzle passage 17 extending from the manifold flow passage 14. Each nozzle 16 may be of varying length in order to conform to the various mold cavity dimensions which may be required for a particular plastic mold.

A first insulating means 18 in the form of a stainless steel insulating ring is disposed about each of the nozzles 16 for inhibiting the heat transfer between each nozzle 16 and the core or cavity 32. The manifold 12 is further insulated from the core or cavity 32 by support blocks 34. The manifold 12 is removably secured to the support blocks 34 and the core 32 by a threaded stud 36 which extends through the support blocks 34 and into threaded engagement with both the manifold 12 and the core 32. A stainless steel sprue 20 extends radially outward from the manifold 12 for facilitating the introduction of plastic injection molding material into the manifold 12. The sprue 20 is insulated from a support member or clamp plate 40 by a second insulating means 22 disposed between the junction of the sprue 20 and the support member or clamp plate 40. The second insulating means 22 is a stainless steel locating ring which is removably secured to the clamp plate 40 by fastening means 38 such as a bolt, or the like, and which inhibits the heat transfer from the sprue to the clamp plate 40.

A third insulating means 24 is disposed at the radiused terminal ends 13 of each branch of the manifold 12 to facilitate relatively low heat transfer from the ends of the manifold 12 to the surrounding material. The third insulating means 24 are aluminum plugs defining the radiused terminal ends 13 of the central flow passage 14 of the manifold 12. In other words, the plugs 24 have curved ends 42 which form the radiused ends 13 within the central flow passage 14. The curved ends 42 reduce the amount of flow shear within the plastic which may occur at these corners as the flow moves through a right turn from the manifold passage 14 to the adjacent nozzle passage 17. A threaded double nut 44 is disposed at the ends of the manifold passages 14 to cap the passages 14 and facilitate the removal of the end plugs 24 if this is required.

Stainless steel reaction means 26 are removably secured radially opposite the radially extending nozzles 16 by fastening means such as a screw 54, or the like, and insulate the manifold 12 from a clamp plate 40. In addition, the stainless steel reaction means 26 or preload pads react between the clamp plate 40 and the manifold, supporting the manifold 12 when it is under resulting pressures produced in the manifold 12 during the hot plastic injection molding process.

Electrical heating means 28 comprising a plurality of heater bands removably disposed about the circumference of the manifold 12 as well as the nozzles 16 supply heat to maintain the plastic at a specified or predetermined temperature. The heater bands 28 comprise two half cylinders electrically wired in parallel to an electrical source such as a junction box. The half cylinders of the heated bands 28 are removably clamped about the circumference of the manifold 12 and nozzles 16 using conventional clamping fasteners or the like.

Temperature-measuring means 30 for monitoring the temperature of the plastic are secured within the manifold 12 and nozzles 16 in thermocouple holes 46 bored through the manifold 12 and the nozzle 16 at points equidistant from the outer diameter of the flow passages 14, 17 and the outer diameter of the manifold 12 and nozzle 16, as shown in FIG. 4. The temperature-measuring means may be thermocouples 30 secured in the thermocouple holes 46 by set screws positioned in threaded holes 50 which are bored perpendicular to the longitudinal axis of the thermocouple holes 46. The thermocouples 30 are electrically wired to a power source such as an electrical junction box and include a stainless braided wire shield 52 which protect against radio frequency noise interference from the heater band electrical current wires (not shown) and thus insure accurate temperature readings.

The heater bands 28 and thermocouples 30 are arranged and monitored in finite zones about the injection system. This multizonal control facilitates more accurate monitoring and control of the temperature of the molten plastic throughout the injection process resulting in less heat loss and better molds.

In its operative mode, molten plastic is injected at high temperatures and pressures into the manifold 12 through the sprue 20. The molten plastic then flows along the central flow passage 14 of the manifold 12 to the nozzles 16. The molten plastic then flows through the nozzle passages 17 of each nozzle 16 to the mold (not shown). The terminal ends 13 of the manifold, equipped with aluminum plugs 24 with curved ends 42, reduce shear flow in the plastic at the terminal ends 13 of the manifold 12 as the flow moves through a 90° bend.

Throughout the injection process, the heater bands 28 maintain the plastic at a specified temperature which is monitored by the thermocouples 20. The multizonal designs of the heating and temperature measuring means 28 and 30 allows the operator to monitor the temperature of the plastic at any point or zone throughout the system thereby exerting increased control over the injection process which results in a better product.

The relative simplicity associated with the manufacturing of an integral or one-piece, cast, insulated manifold affords considerable cost savings. The present invention requires less machining in production than with conventional manifolds. In addition, the amount of heat which is wastefully rejected to the surrounding atmosphere is greatly reduced by the first and second stainless steel insulating means 18, 22 as well as the aluminum plugs 24 and the stainless steel preload pads 26. As a result, the system's energy consumption is thereby reduced.

The invention has been described in an illustrative manner and it is to be understood that the terminology which has been used is intended to be in the nature of words of description rather than of limitation.

Obviously, many modifications and variations of the present invention are possible in light of the above teachings. It is, therefore, to be understood that within the scope of the appended claims wherein reference numerals are merely for convenience and are not to be in any way limiting, the invention may be practiced otherwise than as specifically described.

What is claimed is as follows:

1. A manifold assembly (10) for conveying plastic injection molding material into a mold (32) from a molding material supply through a support (40), said assembly comprising:
   a manifold (12) including a manifold flow passage (14) extending therealong;
   a support member (40) for supporting said manifold (12);
   at least one nozzle (16) extending radially outwardly from said manifold (12) to a distal end, said at least one nozzle (16) including a central nozzle passage (17) extending from and in fluid communication with said manifold flow passage (14);
   insulating means (18,20,22,26,34) for thermally insulating said manifold (12) from the support member (40) and for thermally insulating said manifold (12) and said at least one nozzle (16) from the mold (32);
   said insulating means (18) including an insulating ring disposed about said at least one nozzle (16) in spaced relationship from said distal end of said at least one nozzle (16) to space said at least one nozzle (16) radially from said mold (32), said ring (18) being the only path for conductive thermal energy from said at least one nozzle (16) to said mold (32) except for said distal end of said at least one nozzle in contact with the mold (32);
   said insulating means also including a sprue (20) forming a flow passage extending from and in fluid communication with said manifold (12) for facilitating the introduction of plastic injection molding material into said manifold (12) and a locating ring surrounding said sprue (20) and disposed between said sprue (20) and said support member (40) and forming no part of the flow passage in the sprue and being the only path for thermal energy from said sprue (20) to said support member (40).

2. A manifold assembly (10) as set forth in claim 1 wherein said insulating means includes a reaction means (26) disposed radially opposite said at least one nozzle (16) for insulating said manifold (12) from the support member (14) and for supporting said manifold (12) under pressure.

3. A manifold assembly (10) as set forth in claim 2 further characterized by heating means (28) disposed strategically throughout said assembly (10) about the circumference of said manifold (12) and said at least one nozzle (16), for maintaining the temperature of the plastic injection molding material at a predetermined temperature and temperature measuring means (30) disposed throughout said assembly (10) and being arranged in finite zones along with said heating means (28) for monitoring purposes resulting in multizonal control of the temperature of the plastic injection molding material of the injection process.

4. A manifold assembly (10) as set forth in claim 3 further characterized by said heating means including heater bands (28) comprising two half cylinders clamped about the circumference of said manifold (12) and the circumference of said nozzle (16) with each half of each heater band (28) being electrically wired in parallel with respect to each other.

5. A manifold assembly (10) for conveying plastic injection molding material into a mold (32) from a molding material supply through a support member (40), said assembly comprising:
   a manifold (12) including a manifold flow passage (14) extending therealong;

a support member (40) for supporting said manifold (12);

at least one nozzle (16) extending radially outward from said manifold (12) to a distal end, said at least one nozzle (16) including a central nozzle passage (17) extending from and in fluid communication with said manifold flow passage (14);

insulating means (18,20,22,26,34) for thermally insulating said manifold (12) from the support member (40) and for thermally insulating said manifold (12) and said at least one nozzle (16) from the mold (32);

said insulating means (18) including an insulating ring disposed about said at least one nozzle (16) in spaced relationship from said distal end of said at least one nozzle (16) and spacing said at least one nozzle (16) radially from said mold (32), said ring (18) being the only path for conductive thermal energy from said at least one nozzle (16) to said mold (32) except for said distal end of said at least one nozzle in contact with the mold (32);

said insulating means also including a sprue (20) forming a flow passage extending from and in fluid communication with said manifold (12) for facilitating the introduction of plastic injection molding material into said manifold (12) and a locating ring surrounding said sprue (20) and disposed between said sprue (20) and said support member (40) and forming no part of the flow passage in said sprue and being the only path for thermal energy from said sprue (20) to said support member (40);

said insulating means (26) including reaction means (26) disposed radially opposite said at least one radially extending nozzle (16) for insulating said manifold (12) from said support member (40) and for supporting said manifold (12) under pressure;

said assembly (10) including heating means including heater bands (28) disposed strategically throughout said assembly (10) about the circumferences of said manifold (12) and the circumference of said nozzle (16) for maintaining of the plastic injection molding material at a predetermined temperature and temperature measuring means including thermal couples (30) disposed throughout said assembly (10) and being arranged in finite zones along said heater bands (28) for monitoring purposes resulting in multizonal control of the temperature of the plastic injection molding material throughout the injection process;

said heater bands comprising two half cylinders clamped about the circumference of said manifold (12) and said nozzle (16) with each half of each heater band (28) being electrically wired in parallel with respect to each other;

said insulating means including blocks (34) interconnecting said manifold (12) and the mold (32) and for supporting said manifold (12).

* * * * *